US007638209B2

(12) United States Patent
Koda et al.

(10) Patent No.: US 7,638,209 B2
(45) Date of Patent: Dec. 29, 2009

(54) RECORDING MEDIUM

(75) Inventors: Yasunori Koda, Kanagawa (JP); Mario Fuse, Kanagawa (JP); Kunihiro Takahashi, Kanagawa (JP); Shoji Yamaguchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 443 days.

(21) Appl. No.: 11/391,282

(22) Filed: Mar. 29, 2006

(65) Prior Publication Data

US 2007/0014973 A1 Jan. 18, 2007

(30) Foreign Application Priority Data

Jul. 15, 2005 (JP) ............................ 2005-207181

(51) Int. Cl.
*G11B 5/33* (2006.01)

(52) U.S. Cl. .................................... 428/800; 428/537.5

(58) Field of Classification Search ....................... None
See application file for complete search history.

(56) References Cited

U.S. PATENT DOCUMENTS

| | | | | |
|---|---|---|---|---|
| 4,446,204 | A * | 5/1984 | Kaule et al. | 428/323 |
| 5,583,333 | A * | 12/1996 | Hoshino et al. | 235/493 |
| 7,074,495 | B2 * | 7/2006 | Tamagawa et al. | 428/537.5 |

FOREIGN PATENT DOCUMENTS

| | | |
|---|---|---|
| JP | A 2004-284053 | 10/2004 |
| JP | A 2004-285524 | 10/2004 |

OTHER PUBLICATIONS

"IPaper, A New Media", Paper Gate Systems, Jan. 2005, from www.papergate.net.*

* cited by examiner

*Primary Examiner*—Holly Rickman
(74) *Attorney, Agent, or Firm*—Oliff & Berridge, PLC

(57) ABSTRACT

An aspect of the present invention provides a recording medium including a matrix material and a magnetic material, wherein the contrast density of the surface is about 0.05 or less.

17 Claims, No Drawings

RECORDING MEDIUM

CROSS-REFERENCE TO RELATED APPLICATION

This application claims priority under 35 USC 119 from Japanese Patent Application No. 2005-207181, the disclosure of which is incorporated by reference herein.

BACKGROUND

1. Technical Field

The present invention relates to a recording medium containing a magnetic material that allows printing, by using a common recording material such as ink or toner, and recording and reproduction of information, by magnetic or electromagnetic means.

2. Related Art

Recent widespread use of computers, multifunction machines and networks has resulted in easier retrieval of desired information, and printing and copying of the retrieved information. Accordingly, various apparatuses and methods for strengthening information security are proposed, for preventing leakage of confidential information on printouts illegally copied or printed.

However, the magnetic material does not transmit visible light, whereas the pulp material, which is the matrix material for printing paper, does transmit visible light. In addition, the magnetic material is mostly blackish and low in lightness, whereas the printing paper usually used normally has a basic white color. Thus, the magnetic material contained in the printing paper is easily visible from outside.

Such a printing paper is obviously recognizable as a paper enhanced in information security at first sight, allowing one who is attempting to obtain confidential information to do so by other means, thereby hindering a progress in information security, and can yet encourage leakage and falsification of the confidential information.

SUMMARY

An aspect of the present invention provides a recording medium including a matrix material and a magnetic material, wherein the contrast density of the surface is about 0.05 or less.

DETAILED DESCRIPTION

The recording medium according to an aspect of the present invention includes a matrix material and a magnetic material, wherein the contrast density of the surface is about 0.05 or less.

Thus, the magnetic material contained in the recording medium according to an aspect of the present invention is less easily visible from the outside, under general environmental or use conditions (e.g., when examined as it is placed on a desk or held up to normal indoor illumination or sunlight).

The contrast density is more preferably about 0.03 or less and even better the closer it approaches to 0.

The "contrast density" in an aspect of the present invention, means a difference in optical density between areas on a recording medium surface, and specifically, a density difference between regions containing magnetic material and regions containing no magnetic material on the recording medium face. The recording medium surface is normally plain without patterning or the like, and, if a pattern, symbol, or the like (e.g., rule or logo mark) causing a density difference is intentionally formed on the recording medium face, the contrast density due to such intentional figures are not included within the meaning of the contrast density according to an aspect of the present invention.

The contrast density may be determined by using an optical density analyzer (image quality meter) IQM manufactured by Fuji Xerox Co., Ltd. as the analyzer. Details of the apparatus are described in Japanese Patent Application Publication (JP-B) Nos. 6-68466, 8-14535 and 6-54940, the disclosures of which are incorporated by reference herein.

The IQM is a two-dimensional scanning microdensitometer having a measurement aperture of 10 μm×500 μm in size that permits switching the X and Y directions thereof for analysis of an A3-sized hard copy and allowing density analysis at a sampling interval of 10 μm. The final data are determined with calibration against ISO visual density.

The principal test conditions when the apparatus is used are as follows:

(1) Illumination system: toroidal (ring) illumination placed so as to give an incident angle of 45°

(2) Light source: halogen lamp (4010 K, manufactured by Mitsubishi Electric Corporation)

(3) Acceptance angle: 0°

(4) Sensor: photomultiplier tube (R928HA, manufactured by Hamamatsu Corporation).

(5) Backing material: white sheet having a density of 0.07

The color of the surface of the recording medium according to an aspect of the present invention is not particularly limited and may be selected from various colors, but is preferably substantially similar to the hue of the matrix material. Since copying papers are generally white, the color of the recording medium surface is more preferably based on white. The "the color based on white" includes white and color tinted white, as well as natural colors derived from the material (type of paper) of the recording medium, such as recycled paper made from recycled paper pulp, and faint color tints added intentionally to give a desired color.

Hereinafter, the constituent materials, the layer structure, and the production process of the recording medium according to an aspect of the present invention will be described in detail.

The recording medium according to an aspect of the present invention is not particularly limited, as long as it contains a matrix material and a magnetic material, and the recording material may contain various other materials as required. The recording medium according to an aspect of the present invention may have simply a base material region containing a matrix material and a magnetic material, or may further have a coating layer, as required, on the surface of the base material.

Base Material and Coating Layer

The layer structure of the base material is not particularly limited and may have a single-layer structure or a multi-layer structure of two or more layers, but is preferably a two-layer or three-layer structure in practice.

When a two-layer structure is used, a magnetic material is dispersed in the interface region between the layers. Alternatively, when a three-layer structure is used, it is preferably a structure having a layer containing dispersed magnetic material sandwiched between two layers containing no magnetic material. Yet alternatively, when a single layer is used, since the magnetic material may be present in the region close to the surface of the base material, it is preferable to form a coating layer, to make the magnetic material present in the surface region of base material less visible from the outside.

A base material having a single-layer structure, if desirable, can be prepared by forming raw material containing matrix material and magnetic material into a sheet shape; and, for example, a paper medium can be prepared by using a pulp slurry containing magnetic material in a papermaking process similar to normal papermaking methods. Alternatively, a resin medium can be prepared according to any one of known resin sheet-forming methods, for example by injection molding of a molten resin mixture containing a thermoplastic resin and magnetic material.

Alternatively, a base material having a two-layer structure can be prepared by placing a magnetic material on one side of a base material previously formed and laminating another base material thereon. For the laminating, an adhesive may be used for adhesion of the base materials to each other, and if the matrix material is a thermoplastic resin, the base materials may be thermally fused to each other by heating.

If a magnetic material is placed in the interface region between layers in the process of producing a paper base material, such a base material may be produced in a process including placing a magnetic material on one side of a pulp sheet in the wet state (wet paper) obtained by papermaking and superimposing another pulp sheet in the wet state thereon.

A three-layer structured base material, if desirable, can be prepared by laminating or superimposing a magnetic material-dispersed base material having a single-layer structure (or wet paper) described above and two base materials (or wet papers) containing no magnetic material, as described above.

The function and materials for the coating layer are not particularly limited, and, for example, an image-receiving layer, such as that used when an image is formed in the electrophotographic process for reducing the surface irregularity due to the toner present on an image surface, smoothening the image surface, and providing an image higher in glossiness or a photo-like surface. Alternatively, when the base material has a single-layer structure described above, a coating layer having a function to make the magnetic material present on the surface of base material less visible from outside may be formed, and the coating layer may also have other function, for example, the function of an image-receiving layer as described above.

The coating layer can be formed by applying a coating liquid, containing the materials for the coating layer, onto a base material, according to any one of known coating methods such as a size press, shim size, gate roll, roll coater, bar coater, air knife coater, rod blade coater, blade coater, or the like.

Matrix Material

The matrix material for use in an aspect of the present invention means the principal material for the recording medium (base material thereof) and is not particularly limited, as long as it can be processed into a sheet having a thickness and strength suitable for use in a known recording processes, such as electrophotographic recording and ink-jet recording. It may be, for example, pulp fiber when the recording medium according to an aspect of the present invention is paper, resin when the recording medium is a resin sheet, and metal when the recording medium is a metal sheet such as aluminum foil.

Magnetic Material

The magnetic material for use in an aspect of the present invention is not particularly limited in its magnetic physical properties, composition, shape, or the like, as long as it is a magnetic material having a large Barkhausen effect.

However, among the magnetic physical properties, the hysteresis loop thereof is preferably almost rectangular and the coercive force (Hc) is preferably relatively small.

Examples of the composition of the magnetic materials include alloys of magnetic elements such as Co—Fe—Ni, and alloys containing transition metals and glass-forming elements Si, B, C, or P. By selecting the composition ratio and production method of the constituent elements, various materials having different magnetic characteristics may be used. The hue of the amorphous alloys of the elements above is not greatly affected by the ratio of these elements.

The shape is not particularly limited, as long as it is suitable for exhibiting a large Barkhausen effect. However, the magnetic material is preferably linear (wire-shaped) or strip-shaped, and more preferably wire-shaped, because a large Barkhausen effect demands a particular ratio of length to cross-sectional area.

When the magnetic material is wire-shaped, the diameter depends on the thickness of the recording medium, for dispersion of the magnetic material so as to prevent exposure of the magnetic material on the recording medium surface and local accumulation thereof in the region close to the surface, as well as from the viewpoint of productivity, handling and the like. For example, if the recording medium is a paper having a thickness of around 90 μm, the diameter of the magnetic material is preferably about 40 μm or less, and more preferably, about 30 μm or less. The length is preferably about 10 mm or more.

The magnetic material may be used as it is, dispersed in the recording medium, but is preferably coated with a layer having an insulating property (hereinafter, referred to as an “insulation layer”) for prevention of inhibition of the large Barkhausen effect of the magnetic material dispersed in the recording medium. The material for the insulation layer is not particularly limited, and any one of known insulating materials such as resins and glass may be used. When a resin is used as the insulating material, the resin is preferably a polyimide resin or the like having heat resistance. The insulation layer preferably has an additional function of camouflaging the magnetic material, as will be described below.

The method of forming the insulation layer is not particularly limited, and is selected properly, according to the material used for forming the insulation layer, from known thin film-forming methods including gas-phase deposition methods such as sputtering, CVD (chemical vapor deposition), and vacuum deposition, and liquid-phase coating methods such as dip coating, roller coating, spray coating, and coating by using a sol-gel process; but gas-phase deposition methods are preferably used for forming a uniform and thinner insulation layer. The insulation layer may be formed at about the same time as conversion of the magnetic material into wire. For example, an insulation layer may be formed on a wire of magnetic material immediately after preparation from the molten state by a gas-phase deposition method such as CVD, when the magnetic wire is being cooled.

Camouflaging Method

Examples of the methods of reducing the density contrast of the recording medium surface to 0.05 or less and making the magnetic material contained in the recording medium less visible from outside include methods of increasing the thickness of medium, using a matrix material of lower light transmission, and using a matrix material of a color tone similar to that of the magnetic material.

On the other hand, the recording medium according to an aspect of the present invention preferably has a thickness in the range of approximately 60 to 120 μm for use in printing in common copying machines and the like. The recording medium according to an aspect of the present invention is preferably a paper medium in which a color of the surface is based on white, from the point of high flexibility in use. However, if a magnetic material is simply dispersed in the recording medium having such a configuration, the magnetic material may be easily visible from the outside. Thus, it is preferable to camouflage the magnetic material somehow to make it less visible from the outside, even on paper medium having a standard thickness (85 to 95 μm), which is applicable for the use with copying machines and the like and uses pulp fiber as the matrix material.

Examples of such camouflaging methods are roughly grouped into the following five camouflaging methods (1) to (5):

(1) Method of coating the magnetic material with a layer containing a camouflage material (first camouflaging method)

(2) Method of covering the magnetic material densely with pulp fiber (second camouflaging method)

(3) Method of dispersing a camouflage material in the matrix material (third camouflaging method)

(4) Method of forming a coating layer containing a camouflage material on the surface of base material (fourth camouflaging method)

(5) Method of laminating a sheet on the surface of base material (fifth camouflaging method)

These first to fifth camouflaging methods may be used in combination of two or more. The fourth camouflaging method may be used in the case where the recording medium includes a base material and a coating layer. The first to third and fifth camouflaging methods are applicable to the case where the recording medium is made only of a base material and the case where the recording medium further includes a coating layer.

These camouflaging methods are particularly advantageous when the recording medium according to an aspect of the present invention is a paper medium having a normal thickness; thus, the camouflaging methods will be described below, taking the case where the recording medium according to an aspect of the present invention is a paper medium as an example; but, of course, the method may be used for recording media having other configuration as needed. Hereinafter, these camouflaging methods will be described in more detail.

First Camouflaging Method

The first camouflaging method is a method of coating the magnetic material with a layer containing a camouflage material (hereinafter, referred to as "camouflage layer"). Specifically, the magnetic material is made less visible from outside, by coating the magnetic material with a camouflage layer and thus, making the apparent color tone of magnetic material closer to the color tone of the matrix material.

In an aspect of the present invention, the "camouflage material" is not particularly limited, as long as it can be used for making the magnetic material contained in the recording medium less visible from outside, and examples thereof include materials lowering light transmission, materials having a color substantially similar to the hue of the matrix, and the like.

The camouflage material for use in the first camouflaging method is not particularly limited, but use of a known colorant such as pigment or dye, a fluorescent material, or the like is preferable. The principal material of the camouflage layer may be a colored material such as colored glass or resin. The materials having a color tone identical with or similar to the color tone of matrix material are used favorably. The color tone of camouflage layer may be adjusted to be closer to the color tone of matrix material, by using two or more camouflage materials in combination.

For example, when the color of the matrix material is based on white, a white colorant can be used as the colorant, and when the camouflage layer contains glass, a glass material including $Na_2SiOF_6$, $Al_2O_3$, $Al(OH)_3$, ZnO, or $BaSO_4$ may be used. In a simple method, it is possible to use a coating liquid containing a white colorant dissolved or dispersed in an organic solvent such as methylcyclohexane (so-called correction fluid), for example, TW-40 manufactured by Kokuyo Co., Ltd. or XZL21-EW manufactured by Pentel Co., Ltd.

Alternatively when a fluorescent material is used, it is possible to adjust the color of the camouflage layer white by using two or more fluorescent material respectively having different wavelength regions in combination, or to use a fluorescent material emitting white fluorescence such as fluorescein.

When a fluorescent material is used, the fluorescent material coated on a magnetic material surface (which may have a previously-formed insulation layer) may be further coated with an additional transparent resin; a fluorescent material may be coated on a transparent resin layer that is formed on the magnetic material surface; or alternatively, a camouflage layer may be formed after a fluorescent material is dispersed in a transparent resin. In such a case, the resin is preferably, for example, a parylene resin (poly-monochloro-para-xylylene) that is transparent, colorless and superior in heat resistance (melting temperature: 280° C.).

When a colored material such as the colorant above is used, the apparent color of magnetic material becomes identical with or similar to the color of matrix material, making the magnetic material less visible from outside.

Alternatively when a fluorescent material is used, if the recording medium is, for example, a paper medium, the light entering into the recording medium from outside (in particular, ultraviolet ray included in sunlight or indoor white light) diffuses by reflection on the pulp fiber and hits on the fluorescent material coated on the magnetic material surface, causing fluorescent emission. Thus, a mixed light of the diffused light and the fluorescence is observed visually, making the magnetic material less visible from outside.

On the other hand, an insulation layer is preferably formed on the surface of magnetic material as described above, but in such a case, the camouflage layer and the insulation layer may be formed separately, or alternatively, a magnetic material coating layer having both functions may be formed.

If a camouflage layer and an insulation layer are formed separately, the camouflage layer may be formed on the magnetic material surface and the transparent insulation layer may be formed on the surface thereof; or the insulation layer may be formed on the magnetic material surface and the camouflage layer may be formed on the surface thereof.

However, a magnetic material coating layer having both the camouflaging function and insulation function is preferably formed on the magnetic material surface, because it is possible to make the layer having both function formed on the magnetic material surface thinner and to form the layer much easier.

The total thickness of the magnetic material coating layers formed on the magnetic material surface is preferably smaller and in the range that does not impair the camouflaging or insulating function, independently of whether the coated layer formed on the magnetic material surface has a single-layer structure or a multi-layer structure of two or more layers. For example, if the magnetic material is a wire, the total thickness (diameter) of the magnetic wire and the magnetic material coating layer is preferably smaller than the diameter of the magnetic wire described above (40 μm or less). The thickness of the magnetic material coating layer is preferably 1 to 5 μm as absolute value.

If the recording medium according to an aspect of the present invention is used in printing by the electrophotographic process, the camouflage layer, the insulation layer, or the magnetic material coating layer having the functions of these two layers formed on the magnetic material surface is preferably prepared with a material resistant to degradation during heating for fixing (at around 200° C.). From the viewpoint above, if the material for these layers is a colorant, the colorant is preferably a pigment; and the material for the layer having an insulating function additionally is preferably an inorganic material such as glass or a heat-resistant resin such as polyimide resin or parylene resin.

When a recording medium is produced by the first method, the recording medium can be prepared by a normal method, except that a magnetic material having a camouflage layer previously formed on its surface is used. For example, if the recording medium according to an aspect of the present invention in the single-layer or three-layer structure described above is prepared at least after a step of preparing a base material by papermaking using a pulp slurry containing pulp fiber, the magnetic material having a previously-formed camouflage layer is preferably added to the pulp slurry for dispersing the magnetic material in pulp fiber.

Second Camouflaging Method

The second camouflaging method is a method of covering the magnetic material densely with pulp fiber. In such a case, the light entering into the recording medium containing the pulp fiber is diffused by reflection by the pulp fiber densely covering the magnetic material surface without hitting on the magnetic material absorbing light more easily, making the magnetic material less visible from outside.

Because it is necessary to disperse the magnetic material in pulp fiber in the method, the layer structure of the base material is preferably, fundamentally a single layer or three layers as described above.

The method of covering the magnetic material densely with pulp fiber is carried out preferably by using an adhesive bonding the pulp fiber and the magnetic material surface. Use of a paper-strengthening agent described below or a binder such as polyvinylalcohol (PVA) is preferable as the adhesive.

In addition to the adhesive, usable is a method of pressing a pulp sheet in the wet state obtained by papermaking using a magnetic material-dispersed pulp slurry at a pressure higher than that of the production of normal paper media and adding the density to the pulp fiber covering the magnetic material.

Third Camouflaging Method

The third camouflaging method is a method of dispersing a camouflage material in the matrix material, and a method of making the color of matrix material closer to the color of magnetic material. A colorant such as pigment or dye having a color similar to that of magnetic material can be used as the camouflage material, and the matrix material itself may be the camouflage material.

The method makes the color of matrix material closer to the color of a low-lightness colored magnetic material and lowers the transmittance by coloring the recording medium, and thus, it is possible to make the difference smaller in transmittance between the region containing a magnetic material and the region without it. Thus, the magnetic material becomes less visible from outside.

Fourth Camouflaging Method

The fourth camouflaging method is a method of forming a coating layer containing a camouflage material on the surface of base material, and, in particular, a method favorable when the base material has a single-layer structure.

The coating layer in such a case may be a layer having only the camouflaging function or having another function as well like the image-receiving layer; and a layer having another function such as an image-receiving layer may be formed additionally on a layer having a camouflaging function formed on base material.

The camouflage material contained in the coating layer is not particularly limited, and may be selected properly, accordingly to the color tone of magnetic material and the color tone of matrix material, to make the magnetic material less visible from outside; but, when the recording medium surface is white toned, a white colorant such as white pigment (e.g., alumina or the like) is used favorably. A favorable method of forming the coating layer formed on the base material and constituent materials favorable for the layer in the fourth camouflaging method will be described below.

Fifth Camouflaging Method

The fifth camouflaging method is a method of laminating a sheet on the surface of base material, and, in particular, a method favorable when the base material has a single-layer structure.

The sheet for use in lamination in such a case is not particularly limited, if it has a thickness and a light-blocking property allowing camouflage of the magnetic material, which is visible from outside without the sheet laminated on the base material, by laminating the sheet on the base material; and the sheet may be different in hue from the base material. However, use of a sheet having a color substantially similar to the hue of the base material is usually preferable. The material for the sheet may be different from that for the base material, but is preferably, normally the same. The thickness of the sheet is not particularly limited, but preferably in the range of 15 to 20 μm, for making the entire recording medium thinner.

Any one of known adhesives may be used as the adhesive for use in lamination, and examples thereof include adhesives of a transparent resin such as urethane and polyester. The adhesive is preferably smaller in light transmittance, for improvement in light-blocking property.

Paper Medium

Hereinafter, the case when the recording medium according to an aspect of the present invention is a paper medium will be described in more detail. When the recording medium according to an aspect of the present invention is a paper medium, it can be prepared by using a material and a process for the recording medium fundamentally the same as those for known paper media, except that a magnetic material is contained and a base material having a multi-layer structure of two or three layers is used as needed as described above.

The thickness of the recording medium in such a case is preferably in the range of 60 to 110 μm, more preferably in the range of 60 to 80 μm, similarly to normal paper media.

The base material for use in the paper medium of an aspect of the present invention may contain at least pulp fiber as the primary raw material, and may be a base material described below or a plain paper having the base material surface-treated with a pigment or a binder.

The base material contains pulp fiber; any one of known pulp fibers may be used; and typical examples thereof include chemical pulps such as bleached hardwood Kraft pulp, unbleached hardwood Kraft pulp, bleached softwood Kraft pulp, unbleached softwood Kraft pulp, bleached hardwood sulfite pulp, unbleached hardwood sulfite pulp, bleached softwood sulfite pulp, unbleached softwood sulfite pulp, and pulps prepared by chemical processing of fibrous materials such as wood, cotton, hemp, bast and other fibrous materials.

In addition, ground wood pulps prepared by mechanically pulping woods and chips, chemimechanical pulps obtained by mechanically pulping chemical-impregnated woods and chips, thermomechanical pulps obtained by pulping the chips slightly softened by previous steaming in a refiner, and the like may also be used. These pulps may be obtained from virgin pulps or combined with waste paper pulps if desired.

In particular, if a virgin pulp is used, the virgin pulp is preferably bleached by the method of using only chlorine dioxide but not chlorine gas (Elementally Chlorine Free: ECF) or by the method using ozone/hydrogen peroxide or the like but not a chlorine compound (Total Chlorine Free: TCF).

Raw materials for the waste paper pulps include unprinted waste papers of extremely high-quality, high-quality, medium-grade white, low-grade, and other white papers that are cut, damaged, and irregular in size; high-quality waste papers such as woodfree and coated woodfree papers that are printed or copied; waste papers printed with inks such as aqueous and oil-based inks or with lead pencils; newspaper waste papers containing advertising leaflets of printed woodfree papers, woodfree coated paper, wood-containing paper, or wood-containing coated paper; and waste papers of wood-containing papers, coated wood-containing papers, wood papers, and the like, generated in bookmakers, printshops, cutting facilities, and the like.

The base material for use in an aspect of the present invention is preferably the pulp of raw waste papers bleached at least either by an ozone or hydrogen peroxide bleaching treatment. For obtaining a recording paper higher in whiteness, it is preferable to make the blending ratio of the waste papers obtained by the bleaching treatment above in the range of 50% by weight or more and 100% by weight or less. Further from the viewpoint of resource recycling, the blending ratio of the waste paper pulps above is preferably in the range of 70% by weight or more and 100% by weight or less.

The ozone treatment decomposes fluorescence dyes and the like that are commonly contained in woodfree papers, while the hydrogen peroxide bleaching treatment prevents yellowing caused by the alkalis used in the deinking process. In particular, combined use of these two treatments allows easier deinking of waste papers and at the same time improves the whiteness of the pulps obtained. In addition, the treatment also decomposes and eliminates the chlorine compounds remaining in the pulps and thus is very effective in reducing the content of organic halogen compounds in the waste papers that are bleached with chlorine.

A filler may be added to the base paper, for adjustment of the opacity, whiteness, and surface smoothness thereof. It is preferable to use a non-halogen filler particularly if reduction in the halogen content of recording papers is desirable.

Examples of the usable fillers include white inorganic pigments such as heavy calcium carbonate, light calcium carbonate, chalk, kaolin, calcined clay, talc, calcium sulfate, barium sulfate, titanium dioxide, zinc oxide, zinc sulfide, zinc carbonate, aluminum silicate, calcium silicate, magnesium silicate, synthetic silica, aluminum hydroxide, alumina, sericite, white carbon, saponite, calcium monmorillonite, sodium monmorillonite, and bentonite; and organic pigments such as acrylic plastic pigments, polyethylene, and urea resins. If waste paper pulps are blended to the base paper, the blending amount of the waste paper pulps should be determined by previously estimating the ashes contained in the raw waste-paper pulps.

In addition, an internal sizing agent is preferably added to the base material for use in an aspect of the present invention. Examples of the internal sizing agents include those used in neutral papermaking processes such as neutral rosin-based sizing agents, alkenylsuccinic anhydrides (ASAs), alkylketene dimers (AKDs), and petroleum resin-based sizing agents.

When the surface of base material is adjusted to be cationic, a hydrophilic cation resin or the like may be used as the cationic substance for processing the surface, and the sizing degree of the paper before application of the cationic resin is preferably 10 seconds or more and less than 60 seconds for suppression of penetration of this cationic resin into the paper.

In addition, a paper-strengthening agent may be added internally or externally to the base material as needed. Examples of the paper-strengthening agents include starch, modified starches, vegetable gums, carboxymethylcellulose, polyvinylalcohol, polyacrylamide, urea-formaldehyde resins, melamine-formaldehyde resins, dialdehyde starch, polyethyleneimine, epoxidized polyamides, polyamide-epichlorohydrin resins, methylol-modified polyamides, chitosan derivatives, and the like: and these materials may be used alone or in combination.

In addition, various additive commonly used in paper medium such as dye and pH adjuster may be used as needed.

It is possible to prepare the base material for use in an aspect of the present invention by placing the magnetic material at the interface of layers or dispersing it in the layer as described above, after the step of preparing such a base material or after drying the pulp sheet obtained after papermaking.

The base material obtained may be subjected to a surface treatment with a surface-sizing solution. A coating layer may be formed on the base material as needed. The surface treatment may be carried out by coating a surface sizing solution or coating liquid for forming a coating layer on the base material by using a coating device commonly used in the art such as a size press, shim size, gate roll, roll coater, bar coater, air knife coater, rod blade coater, or blade coater.

In addition, a coating layer containing a pigment and an adhesive as principal materials may be formed on the base material, for providing the recording medium according to an aspect of the present invention with a texture similar to that of conventional coat papers and also for making the magnetic material less visible from outside by the fourth camouflaging method.

Examples of the pigments for use in the coating layer include common pigments used in general coated paper such as mineral pigments including heavy calcium carbonate, light calcium carbonate, titanium dioxide, aluminum hydroxide, satin white, talc, calcium sulfate, barium sulfate, zinc oxide, magnesium oxide, magnesium carbonate, amorphous silica, colloidal silica, white carbon, kaolin, sintered kaolin, delaminated clay, aluminosilicate salts, sericite, bentonite, smectite and the like, polystyrene resin fine particles, urea formaldehyde resin fine particles, fine hollow particles, and other organic pigments; and these pigments may be used alone or in combination of two or more.

The adhesive for use in the coating layer is, for example, a synthetic or natural adhesive. Examples of the synthetic adhesives include those of a copolymer such as styrene-butadiene, styrene-acrylic, ethylene-vinyl acetate, butadiene-methyl methacrylate, or vinyl acetate-butyl acrylate, polyvinylalcohol, a maleic anhydride copolymer, an acrylic acid-methyl methacrylate copolymer, and the like. One or more of these synthetic adhesives are used according to applications. The adhesive is preferably used in an amount in the range of 5 to 50% by weight, more preferably of approximately 10 to 30% by weight, with respect to 100% by weight of the pigment.

Examples of the natural adhesives include commonly known adhesives such as oxidized starches, esterified starches, enzyme-modified starches, cold water-soluble starches obtained by flash drying thereof, casein, soy bean protein, and the like. The adhesive is also used in an amount in the range of 0.1 to 50% by weight, more preferably of approximately 2 to 30% by weight, with respect to 100% by weight of the pigment.

In addition, various additives commonly blended in pigments for coated paper, such as dispersant, thickener, moisturizer, antifoam, and water repellent, may be used as needed.

The coating composition containing the components described above thus prepared can be coated on-machine or off-machine in a coating machine commonly used in preparation of the coated paper, such as blade coater, air knife coater, roll coater, reverse roll coater, bar coater, curtain coater, die slot coater, or gravure coater, on a base material into a single-layer or multi-layer structure. The coating amount is normally, approximately 5 to 15 g/m$^2$ per face as dry weight, but may be higher than the range described above, to make the magnetic material less visible from outside in an aspect of the present invention.

Smoothing of the coated film is preferably performed in a smoothing machine commonly used, for example by super calendering, machine calendering, or soft nip calendering, and the coated paper is preferably finished to have a white-paper glossiness of 30% or more.

EXAMPLES

Hereinafter, an aspect of the present invention will be described with reference to Examples, but it should be understood that an aspect of the present invention is not limited to these Examples.

Example 1

Magnetic Material

A Fe—Co based amorphous magnetic wire (Hc: 19.1 A/m) having a length of 25 mm and a diameter of 27 μm is made available as the magnetic material. The magnetic wire is ash black in color, and the color coordinates L*, a*, and b* thereof according to the L*a*b* color system specified by JIS Z8729, the disclosure of which is incorporated by reference, are respectively, 16.9, 0.0, and 12.6.

Then, an insulation layer having a thickness of approximately 5 μm and a camouflage layer having a thickness of approximately 2 μm are disposing on the magnetic wire in that order, according to the procedure below, to give a coated magnetic wire. The coated magnetic wire is white in color.

Preparation of Insulation Layer

The insulation layer is formed by processing of a magnetic material in a molten state into wire, immediately conveying the magnetic wire in a tightly sealed chamber, and forming a silica film in the chamber by CVD.

Preparation of Camouflage Layer

Then, the magnetic wire having the insulation layer that is cooled sufficiently is immersed in a white coating liquid (TW-40, manufactured by Kokuyo), withdrawn at an almost constant speed, removing excessive solution, and then dried for several minutes, to form a camouflage layer on the magnetic wire surface.

Preparation of Recording Medium

To a pulp slurry having a freeness of 430 ml obtained by beating a pulp slurry containing 80 parts by weight of a bleached broadleaf Kraft pulp (LBKP), 10 parts by weight of a bleached conifer Kraft pulp (NBKP), and 10 parts by weight of an organic synthetic fiber (common name: para-aramide fiber, trade name: TECHNORA, manufactured by Teijin Ltd.) in a Niagara beater (manufactured by Kumagai Riki Kogyo Co., Ltd.), added are 8 parts by weight of light calcium carbonate (Tamapearl P-121, manufactured by Okutama Kogyo Co., Ltd.), 0.5 part by weight of aluminum sulfate, 0.5 part by weight of a cationized starch (trade name: MS4600, manufactured by Nihon Shokuhin Kako Co., Ltd.), 0.09 part by weight of an alkenylsuccinic anhydride (FIBRAN 81, manufactured by National Starch & Chemical) and 0.8 part by weight of a crosslinking agent (common name: carbodiimide crosslinking agent, Carbodilite V-04) with respect to 100 parts by weight of the pulp fiber solid matter; and the mixture thereof is diluted with white water, to give a pulp slurry having a solid matter concentration of 0.3% by weight.

The pulp slurry is agitated for two hours and sheeted in Oriented Sheet Former (manufactured by Kumagai Riki Kogyo Co., Ltd.) under the condition of a jet pressure of 1.5 kg/cm$^2$, a drum rotational velocity of 950 m/min; and two A4-sized papers are cut from the wet paper and one of them is placed on the other as it is reversed. Before the lamination above, 5 to 10 coated magnetic wires having a length of 25 mm described above are placed at a constant distance on one of the wet papers in the A4-sized area.

The composite of two wet papers laminated is then pressed in a square sheet machine press 2570 (manufactured by Kumagai Riki Kogyo Co., Ltd.) under a pressure of 10 kg/cm$^2$ for 3 minutes.

An oxidized starch (ACE B, manufactured by Oji Cornstarch Co., Ltd.) is coated on the wet paper in a coating amount of 2.5 g/m$^2$ as dry weight in a size pressing machine, and, after drying, the resulting sheet is smoothened by machine calendering until it has an Oken-type smoothness of 30 second, to give a base material having a basis weight of approximately 52 g/m$^3$, which is used as the recording medium of Example 1.

Example 2

A coating composition containing 100% by weight of pigment components [36% by weight of heavy calcium carbonate (trade name: SOFTON 2200, manufactured by Bihoku Funka Kogyo Co., Ltd.), and 64% by weight of Kaolin (ULTRA WHITE 90, manufactured by Engelhard)], 3.5% by weight of an oxidized starch (ACE A, manufactured by Oji Cornstarch Co., Ltd.) (solid to pigment ratio; the same shall apply hereinafter), 12% by weight of a synthetic adhesive (LX407H, manufactured by Zeon Corporation), and 0.3% by weight of a dispersant (ARON T-40, manufactured by Toagosei Co., Ltd.), is prepared as a coating liquid for forming a coating layer.

Then, the coating composition is coated on both faces of the recording medium (base material) obtained in Example 1 in an amount of 6 g/m$^2$ as dry weight by using a blade coater, and the resulting medium is, after drying, smoothened by super calendering at a roll temperature 50° C., until it has a white-paper glossiness of 53%, to give a recording medium of Example 2 having a basis weight of approximately 64 $g/m^2$. The fiber orientation ratio of the recording medium obtained is 1.11.

Example 3

A sheet is laminated on one face of a base material prepared in the same manner as in Example 1, except that the basis weight is adjusted to approximately 70 $g/m^2$. The sheet used for lamination is a sheet obtained by pressing the wet paper used in Example 1 before lamination (however, the basis weight is adjusted to be 25 $g/m^2$) in a similar manner to Example 1. Lamination is performed by forming a layer of a polyester resin in the molted state at around 210° C. having a thickness of approximately 15 μm and bonding the base material and the sheet by inserting it between them before pressing.

Comparative Example 1

A recording medium of Comparative Example 1 is prepared in the same manner as in Example 1, except that the coated magnetic wire is replaced with a non-coated magnetic wire.

Reference Sample 1

A recording medium Reference Sample 1 is prepared in the same manner as in Example 1, except that the magnetic wire is not used.

Reference Sample 2

A recording medium of Reference Sample 2 is prepared in the same manner as in Example 2, except that the magnetic wire is not used.

Reference Sample 3

A recording medium of Reference Sample 3 is prepared in the same manner as in Example 3, except that the magnetic wire is not used.

The contrast density of the recording media thus obtained in Examples 1 to 3 and Comparative Example 1 and the appearance of the recording media obtained in Examples 1 to 3, Comparative Example 1, and Reference Samples 1 to 3 are evaluated organoleptically by visual observation. Results are summarized in Table 1.

In printing test by using a commercially available inkjet printer or electrophotographic copying machine, the recording media of Examples 1 to 3 and Comparative Example 1 containing a magnetic material allow formation of an image, similarly to the recording media of Reference Samples 1 to 3.

TABLE 1

| | Configuration of recording medium | | | Evaluation results | |
|---|---|---|---|---|---|
| | Base material | Coating layer or laminate | Coating of magnetic material | Contrast density | Visual evaluation |
| Example 1 | Two layers | No | Yes | B | B |
| Example 2 | Two layers | Yes | Yes | A | A |
| Example 3 | Two layers | Yes | Yes | A | B |
| Comparative Example 1 | Two layers | No | No | C | C |

The measurement and evaluation methods and the evaluation criteria for the contrast density and visual observations shown in Table 1 are as follows.

Evaluation of Contrast Density

The contrast density is determined by the method described above. Criteria for the evaluation results shown in Table 1 are the followings:

A: Contrast density: 0.02 or less.

B: Contrast density: more than 0.02 and 0.05 or less.

C: Contrast density: more than 0.05, at a level that causes problems in practice Visual Evaluation The visual evaluation is performed by using the recording medium of Reference Samples as the standard, and comparing Reference Samples having the same layer structure of the base material, coating layer, and lamination with the respective Examples and Comparative Examples.

The respective recording medium are laid on two sheets of paper having the same hue as the recording medium and placed on a desk. The appearance of the recording medium is observed visually under indoor illumination light, i.e., under a white fluorescent lamp (60 W) directly above the desk for visual observation of recording medium; and the appearance of the recording medium when it is held up to the light is also examined. The evaluation criteria are as follows:

A: There is almost no difference in appearance of the recording medium to that of the Reference Sample.

B: There is almost no difference in appearance of the recording medium to that of the Reference Sample when the recording medium is observed on the desk, although there are some indications of the magnetic material observed when the recording medium is carefully scrutinized close up or when it is held up to the light.

C: There is distinct difference in appearance from the recording medium to that of the Reference Sample. It is at a level causing problems in practice.

Hereinafter, embodiments of the invention will be described. However, the invention is not limited to these embodiments.

[1] A recording medium, comprising a matrix material and a magnetic material, wherein the contrast density of the surface is about 0.05 or less.

[2] The recording medium described in the embodiment [1], wherein the color of the surface is substantially similar to the hue of the matrix material.

[3] The recording medium described in the embodiment [1], wherein the matrix material contains pulp fiber.

[4] The recording medium described in the embodiment [1], wherein the magnetic material is coated with a layer containing a camouflage material.

[5] The recording medium described in the embodiment [1], wherein the magnetic material is coated with an insulation layer.

[6] The recording medium described in the embodiment [5], wherein the insulation layer contains a polyimide resin or silica.

[7] The recording medium described in the embodiment [3], further comprising an adhesive.

[8] The recording medium described in the embodiment [7], wherein the adhesive is a paper strengthening agent or polyvinylalcohol.

[9] The recording medium described in the embodiment [1], wherein a camouflage material is contained in the matrix material.

[10] The recording medium described in the embodiment [1], wherein the magnetic material and the matrix material are contained in a base material, and the recording medium further comprises a coating layer containing a camouflage material formed on at least one face of the base material.

[11] The recording medium described in the embodiment [10], wherein the camouflage material contains a pigment.

[12] The recording medium described in the embodiment [1], wherein the contrast density of the surface is about 0.03 or less.

[13] The recording medium described in the embodiment [1], wherein the color of the surface is based on white.

[14] The recording medium described in the embodiment [1], wherein the magnetic material is wire-shaped or strip-shaped.

[15] The recording medium described in the embodiment [1], wherein the magnetic material is wire-shaped having a diameter of about 40 μm or less.

[16] The recording medium described in the embodiment [1], wherein the magnetic material is wire-shaped having a length of about 10 mm or more.

What is claimed is:

1. A recording medium, comprising:

a matrix material layer;

a wire-shaped magnetic material that overlaps or is integrated into at least a portion of the matrix material layer; and an insulation material that is applied to the wire-shaped magnetic material, the insulation material being integrally adhered to a surface of the wire-shaped magnetic material in accordance with the shape thereof, wherein the matrix material layer has a surface which has a contrast density equal to about 0.05 or less, the contrast density being a difference in optical density between:

(a) portions of the matrix material layer in which the wire shaped magnetic material is not integrated or overlapping; and (b) portions of the matrix material layer in which the wire-shaped magnetic material is integrated or overlapping.

2. The recording medium of claim 1, wherein the color of the surface is substantially representative of the hue of the matrix material layer.

3. The recording medium of claim 1, wherein the matrix material layer contains pulp fiber.

4. The recording medium of claim 1, wherein the wire-shaped magnetic material is coated with a layer containing a camouflage material.

5. The recording medium of claim 1, wherein the insulation layer contains a polyimide resin or silica.

6. The recording medium of claim 3, further comprising an adhesive that is applied to the matrix material layer.

7. The recording medium of claim 6, wherein the adhesive is a paper strengthening agent or polyvinylalcohol.

8. The recording medium of claim 1, wherein a camouflage material is contained in the matrix material layer.

9. The recording medium of claim 1 wherein the wire-shaped magnetic material and the matrix material layer are contained in a base material, and the recording medium further comprises a coating layer containing a camouflage material formed on at least one face of the base material.

10. The recording medium of claim 9, wherein the camouflage material contains a pigment.

11. The recording medium of claim 1,wherein the contrast density of the surface is about 0.03 or less.

12. The recording medium of claim 1, wherein the surface has a color that is substantially white.

13. The recording medium of claim 1, wherein the wire-shaped magnetic material has a diameter of about 40 μm or less.

14. The recording medium of claim 1, wherein the wire-shaped magnetic material has a length of about 10 mm or more.

15. The recording medium of claim 1, wherein the wire-shaped magnetic material is coated with a layer containing a fluorescent material.

16. The recording medium of claim 15, wherein the fluorescent material has a color being substantially representative of the hue of the matrix material layer.

17. The recording medium of claim 1, wherein the insulation material is formed by a gas-phase deposition method or a liquid-phase coating method.

* * * * *